April 13, 1954
J. MEIENHOFER
2,674,809
APPARATUS FOR THERMIC TREATMENT BY INFRARED RADIATION
Filed Aug. 20, 1951
2 Sheets-Sheet 1
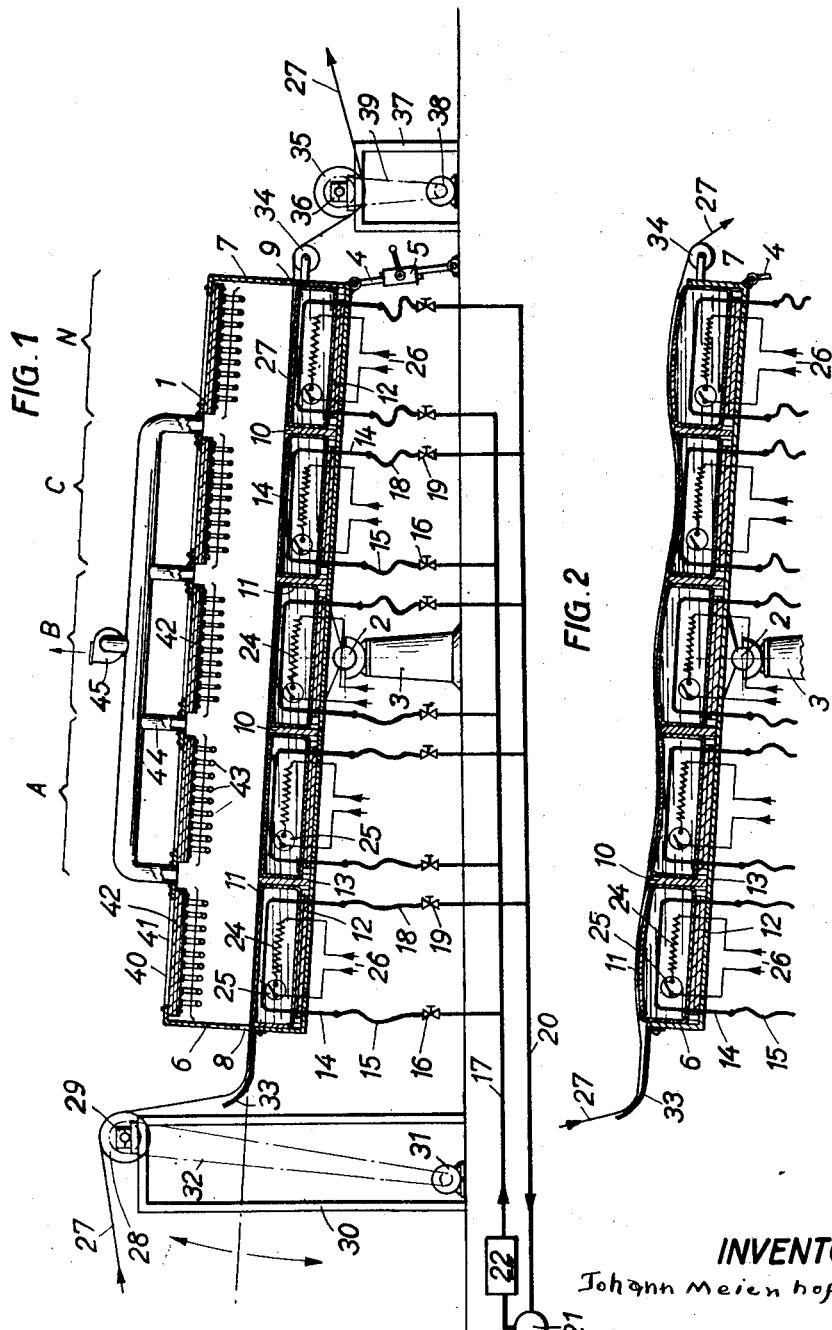
INVENTOR:
Johann Meienhofer
By
Henderoth, Lind & Ponack
Attorneys.

April 13, 1954  J. MEIENHOFER  2,674,809
APPARATUS FOR THERMIC TREATMENT BY INFRARED RADIATION
Filed Aug. 20, 1951  2 Sheets-Sheet 2
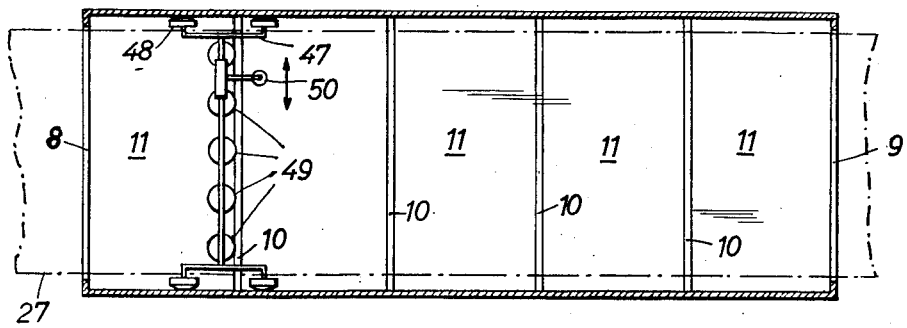
INVENTOR:
Johann Meienhofer Patented Apr. 13, 1954

2,674,809

UNITED STATES PATENT OFFICE 2,674,809

APPARATUS FOR THERMIC TREATMENT BY INFRARED RADIATION

Johann Meienhofer, Goldach/Sankt Gallen, Switzerland, assignor of one-half to Raduner & Co. A.-G., Horn, Switzerland, and one-half to Wolfgang von Berlepsch-Valendas, Basel, Switzerland Application August 20, 1951, Serial No. 242,776

Claims priority, application Switzerland August 24, 1950

4 Claims. (Cl. 34—48)

The present invention relates to an apparatus for the thermic treatment of articles and materials by infra-red radiation, and more particularly, though not exclusively, to an apparatus for such treatment of textile goods.

It has been known for a long time to subject textile goods to infra-red radiation, either for drying wet or moist tissues and the like, or for setting synthetic resins which have been applied in solutions or emulsions to goods of the said kind. However, the results obtained have often been unsatisfactory. The opinion has therefore been voiced that infra-red radiation as such is not suitable for the treatment or improvement of textiles.

The failures which have been encountered in such attempts mainly result from the fact that the thermic conditions of the radiation treatment have been left uncontrolled, so that the process took the natural course which takes place when a body is exposed to radiating energy. The applicant has found out, however, that it is necessary to control the effect of radiation during the treatment and to choose a radiation of such spectral composition as is best suited to the absorption characteristics of the article or material to be treated.

One object of the present invention is to provide an apparatus by which radiation may be applied to textile and other goods under perfect control of the intensity of the radiation applied and of the temperature and other conditions prevailing in the said goods at any stage during the whole period of treatment.

Another object of the invention is to provide means whereby such goods may be subjected to controlled radiation in a continuous process which can, if desired, be automatized to a large extent.

A further object of the invention is to provide means for measuring the moisture, temperature or other conditions of the goods at any stage of the treatment.

Still another object of the invention is to provide an apparatus for infra-red radiation treatment of goods which will be efficient and economic to operate.

Further objects and advantages of the said invention will become apparent from the description now to follow, with reference to the accompanying drawings, of some preferred embodiments of the invention and of the way in which they are to be operated.

In the drawings:

Fig. 1 is a longitudinal section of an apparatus according to the invention for the continuous thermic treatment by infra-red radiation, of tissues in continuous strip form;

Fig. 2 is a section corresponding to Fig. 1, of an alternative embodiment of part of the said apparatus;

Fig. 3 is a diagrammatic representation of the arrangement of the radiation tube supporting panels in an apparatus of the kind shown in Fig. 1;

Figs. 4 and 5 are diagrammatic representations of two alternative arrangements of the radiation tubes on one of the said panels;

Fig. 6 is a plan view showing a moisture and temperature measuring device which may be incorporated in, or used with the apparatus shown in Fig. 1; and Fig. 7 is a front view of the measuring device according to Fig. 6.

While the following description primarily relates to apparatus for the treatment of textile goods, and more particularly of a tissue or fabric shaped as a continuous or comparatively long strip, it will be understood that the said apparatus, either with suitable modifications or in substantially unchanged form, could also be used for the treatment of paper, natural or synthetic leather, food-stuffs and many other goods.

Referring to Fig. 1, the apparatus comprises a housing 1 of box-like construction resting on a transverse pivot pin 2 supported on top of a column 3. At one of its ends, the housing 1 also is supported by a strut 4 in which a jack 5 is incorporated for adjusting the length of the strut, whereby the housing 1 can be tilted at will within certain limits about the axis of pivot pin 2.

The housing 1 itself has end walls 6 and 7 in which horizontal slots 8 and 9, respectively, are provided for the passage of the tissue run to be treated. The lower part of the housing, i. e. that part which is situated below the path of the tissue between the slots 8 and 9, is subdivided into compartments by transverse walls 10, and in each of these compartments a closed hollow element 11 made from metal or other heat-conducting material is inserted with its bottom resting on a thermally insulating plate 12 supported by the bottom 13 of housing 1. The top surfaces of the hollow elements 11 and of the transverse walls 10 are flush with each other to form a smooth plane for supporting the tissue to be treated between the slots 8 and 9. The said top surfaces are highly polished both to ensure smooth displacement of the tissue along the said plane and to reflect the infra-red radiation which reaches these surfaces through the tissue. In each of the hollow elements 11 there is a separate heat exchange pipe 14, the central part of which is substantially parallel to the top wall of the element and preferably is carried in zigzags (not shown) along the underside of said top wall. The ends of pipe 14 are carried through the bottom wall of the hollow element 11, the insulating plate 12 and the bottom 13 of the housing to the outside of the latter. One end of each of the pipes 14 is individually connected, through flexible pipes 15 and a separate regulating valve 16, to a common supply pipe 17, while the opposite end of each pipe 14 is similarly connected, through pipes 18 and another regulating valve 19, to a common discharge pipe 20. The latter leads to the inlet of a circulating pump 21, the outlet of which is connected through a temperature conditioning device 22, comprising a heater and/or a cooler, or a heat exchanger, to the above-mentioned supply pipe 17. Thus, water or other suitable liquid can be circulated from the temperature conditioning device 22, where it is heated or cooled to a desired temperature, through the supply pipe 17, the heat exchange pipe 14, the discharge pipe 20 and the pump 21, and the supply of the heated or cooled water or other liquid to each of the elements 11 can be individually adjusted by means of the regulating valves 16 and 19 to give the desired temperature to the cover of the said individual element 11. To increase the transmission of heat between the pipe 14 and the element cover, the element is filled to its top with water or other liquid. Moreover, an electric heating element comprising a resistor 24 and a thermostat switch 25 and connected at 26 to a suitable source of current, may be mounted in each of the elements 11 for additional heating.

The tissue to be treated is in the shape of a continuous piece 27 arriving over a roller 28 supported in bearings 29 on a support 30 and driven from a motor 31 by means of a belt drive 32. From the roller 28, the tissue drops to a curved plate 33 mounted ahead of slot 8 and guiding the tissue into the latter. By means of the jack 5, the housing 1 will suitably be tilted in such a way, according to the kind of tissue, its speed, etc., that it moves over the elements 11 substantially under its own weight. After emerging from housing 1 through the slot 9, the tissue runs over a roller 34 rotatably supported on the housing 1, and is discharged by another roller 35 supported in bearings 36 on a support 37 and driven from a motor 38 by means of a belt 39.

The ceiling or upper part 40 of housing 1 has a number of large openings 41 each facing one of the elements 11 of the bottom part, and under each of these openings is mounted a supporting panel 42, preferably made from insulating material and carrying a set of conventional infra-red radiating tubes 43 with their usual electrical equipment (not shown). Between the opening 41, ventilation ducts 44 leading to a common blower 45 are provided for removing the heated air, steam and dust from the inside of housing 1, which air will be replaced by fresh air entering through slots 8 and 9.

The operation of the described apparatus is as follows: While the tissue 27 is moved continuously through the housing 1, it runs over the plane formed by the top surfaces of the elements 11, between the slots 8 and 9, and while moving over each of the said elements, it is subjected to the radiation of the set of tubes 43 which faces the particular element; part of this radiation reaches the surface of the hollow element and there is reflected into the tissue. By this radiation, the tissue is heated; its temperature, however, not only depends on the kind and intensity of the infra-red radiation, but also on the surface temperature of the said element. By suitable opening and shutting of the regulating valves 16 and 19, and by the action of the thermostat switch 25, which switches the resistor 24 into and out of circuit to supply the amount of heat required, the temperature of the element surface is maintained within narrow limits. Thus the tissue 27 is subjected, on each element 11, to the temperature most suitable for its treatment at the particular stage. By maintaining the surfaces of the several elements 11 each at a suitable temperature, any desired time function of the tissue temperature can be obtained and maintained during the passage of the tissue 27 from slot 8 to slot 9.

The embodiment partly shown in Fig. 2 differs from that of Fig. 1 only in that the top surfaces of the elements 11 are not in a common plane but provide an undulated surface, the cover of alternating elements being convex and concave, respectively.

Fig. 3 diagrammatically shows an alternative arrangement of the openings 41 and panels 42 supporting the radiating tubes in the ceiling of housing 1. Instead of one opening and panel extending through substantially the whole width of the housing 1, in each longitudinal portion such as A, B, C ... N (Fig. 1), there are three panels side by side such as $a_1$, $a_2$, $a_3$; $b_1$, $b_2$, $b_3$; ... $n_1$, $n_2$, $n_3$, respectively. This transversal subdivision which includes the possibility of switching off the tubes 43 on either or both lateral panels $a_1$, $b_1$, $c_1$ ... $n_1$ and $a_3$, $b_3$, $c_3$ ... $n_3$, or on the central panels $a_2$, $b_2$, $c_2$ ... $n_2$ of each longitudinal portion A, B, C ... N, provides for the treatment of tissue pieces of different width.

Fig. 4 diagrammatically shows the arrangement of the radiating tubes 43 in one longitudinal portion N of Fig. 3. In this case, the individual radiating tubes 41 are arranged transversally with respect to the direction of displacement of the tissue, and they have different lengths according to the width of the panels $n_1$, $n_2$, $n_3$.

However, the tubes may also be arranged in a general direction parallel to the said direction of displacement. The individual tubes may be straight (not shown), or they may be V-shaped as shown at 46 in Fig. 5. In this case, the height $h$ of the V formed by each tube 46 preferably is equal or greater than the distance between adjacent tubes, so that each point of the width of the tissue is covered by at least one tube in each longitudinal portion of the housing. If straight tubes are chosen, they may be placed at an angle with respect to the direction of displacement of the tissue, to give the same effect. Although grouping of the tubes by panels may be dispensed with in the last-mentioned arrangements, provision could be made for switching out individual tubes or groups of tubes to account for different widths of the tissue.

Various kinds of radiating tubes 43 or 46 may be used, such as infra-red incandescent lamps, electric invisible-radiation lamps, or invisible-radiation producing devices heated by gases or high-temperature liquids. In the described embodiments, the tubes are supposed to be electric invisible-radiation lamps.

The temperature of the tubes may be adjustable by varying their supply voltage. Also, the radiation output could be regulated by switching into and out of circuit a convenient number of radiating tubes or elements.

In Figs. 6 and 7, the reference number 47 indicates a small carriage which may be used for checking the condition of the tissue under treatment in housing 1 of the apparatus. This carriage has four rollers 48 arranged for running on the extreme margin of the surface supporting the tissue, so as to straddle the latter. A number of condensator disks 49 are carried side by side on the carriage 47 for measuring the capacity between the disks and the said supporting surface. This will enable the operator to determine the dielectricity constant of the tissue and thus ascertain the moisture content of the latter. Moreover, a thermo-element 50 is transversally displaceable on the carriage 47 and can be lowered at any desired place onto the tissue, by means of a lever 51. By measuring the tension set up in this thermo-element when in contact with the tissue, the local temperature of the tissue can be ascertained at practically any desired point of the tissue. This thermo-element could also be used as a temperature feeler for the purpose of automatic control of the temperature and/or humidity of the tissue.

The described apparatus can be used in combination with other apparatus provided for treatment of the tissue within the housing 1. This apparatus may consist of or comprise devices for treating the tissue with reactive or indifferent gases or with steam, or calendering devices, or devices for additional application of ultra-sound, ultra-violet rays, or high frequency. A treatment at high or reduced pressure, or in a metal bath, or in electric high-tension fields may also be provided for.

What I claim is:

1. An apparatus for the continuous treatment of textile fabric strips with infra-red radiation comprising a housing, a radiating ceiling in such housing divided into a plurality of sections, a supporting means carrying the textile strip being treated, said supporting means being subdivided into a plurality of compartments corresponding to the sections of said radiating ceiling and adapted to permit tension-free movement of the textile strip along the entire surface of the support below said radiating ceiling, said radiating ceiling comprising in the direction of movement of the textile strip in each of said sections a plurality of infra-red radiating elements, means operatively connected to each of said radiating elements to control the member of elements turned on as well as the emissivity temperature of said elements and thus the density and frequency of infra-red radiation produced within each section on the strip, said compartments of the support provided independently with independent heating and cooling devices which are adjustable and regulatable for the needed thermic conditions created by the action of the infra-red radiation emitted by the said sections of the radiating ceiling.

2. An apparatus as in claim 1 wherein said housing is provided with an inlet aperture and an outlet aperture for the textile strip at opposite ends of said housing, and independently regulatable driving means are provided at said opposite ends to regulate the speeds at said ends assuring stressless movement of the strip inside of the apparatus.

3. An apparatus as in claim 1 wherein means are provided to tilt the said housing to vary its inclination so as to adjust it to the coefficient of friction of the various kinds of strips and thus to provide for absence of stress.

4. An apparatus for the continuous thermic treatment of resin impregnated textile fabric strips by infra-red radiation comprising a housing, a radiating ceiling in said housing divided into a plurality of sections, a supporting means carrying the textile strip being thermically treated, said supporting means subdivided into a plurality of compartments corresponding to the sections of said radiating ceiling and adapted to permit tension-free movement of the textile strip along the entire surface of the support below said radiating ceiling, said radiating ceiling comprising in the direction of movement of the textile strip in each of said sections a plurality of infra-red radiating elements, means operatively connected to each of said radiating elements to control the number of elements in action as well as the emissivity temperature of the said elements and thus the density and frequency of infra-red radiation produced thereby within each section so as to progressively adjust and control the condensing and polymerizing effect on the resin impregnated strip in bringing the emissivity temperature and the radiant density within each section into optimum adjustment for the absorption and baking characteristics of the resin impregnated strips, said compartments of the support being provided independently with heating and cooling devices which are adjustable and regulatable for the needed thermic conditions created by the action of the infra-red radiation emitted by the said sections of the radiating ceiling.

References Cited in the file of this patent

UNITED STATES PATENTS

| Number | Name | Date |
|---|---|---|
| 1,470,540 | Ostenberg | Oct. 9, 1923 |
| 1,563,461 | Alexander | Dec. 1, 1925 |
| 1,569,296 | Odell | Jan. 12, 1926 |
| 1,752,875 | Abeles | Apr. 1, 1930 |
| 1,968,545 | Van Arsdale | July 31, 1934 |
| 2,022,593 | Fuykers | Nov. 26, 1935 |
| 2,179,562 | Pennell | Nov. 14, 1939 |
| 2,320,513 | Drummond | June 1, 1943 |
| 2,355,391 | Nelson et al. | Aug. 8, 1944 |
| 2,422,481 | Grantham | June 17, 1947 |
| 2,571,815 | Benoit et al. | Oct. 16, 1951 |
| 2,578,633 | Mauffre | Dec. 11, 1951 |